FREQUENCY DISCRIMINATORY SYSTEMS

Filed Oct. 29, 1949 2 Sheets-Sheet 1

Inventor
GORDON L. FREDENDALL
By
Olin V. Mitchell
Attorney

Inventor
GORDON L. FREDENDALL
By Olin A. Mitchell
Attorney 2,711,516
Patented June 21, 1955

2,711,516

FREQUENCY DISCRIMINATORY SYSTEMS

Gordon L. Fredendall, Feasterville, Pa., assignor to Radio Corporation of America, a corporation of Delaware Application October 29, 1949, Serial No. 124,298

4 Claims. (Cl. 333—75)

The present invention relates to methods and circuits for effecting frequency separation of and differentiation between predetermined frequency components in an electrical signal channel.

In more particularity, although not necessarily exclusively, the present invention deals with electrical circuit arrangements and methods for dividing complex electrical signals into predetermined groups of frequency components such that the phase relationship of the components established in the original signal is not altered from that found in their separated or divided form.

In another one of its aspects, the present invention deals with an improved method and apparatus for extracting from a given wide band signal channel certain predetermined frequency components without producing deleterious phase distortion in either the signal channel itself or in the extracted electrical signals.

There is often encountered in the electrical art, the need for separating complex waveform signals into certain bands of frequency components. Suitable filter networks having predetermined amplitude vs. frequency pass characteristics may be, of course, used either singly or in combination to produce most any desired frequency separation schedule of a given signal, provided sufficient complexity and expense can be tolerated in the construction of the filter network. However, even at best, the phase relationship between the various separated components permitted by a given filter network or combination of networks is generally altered from these phase relationships existing in the original complex signal.

In some types of electrical equipment and circuit arrangements, this phase distortion between the separated frequency components of given signals is not of great importance as, for example, in cases where each separated component signal range is designated for a particular function which is unrelated to the function performed by the other separated frequency components. On the other hand, where the separated frequency components are to be later combined to form at least in part the intelligence represented in the original signal, the phase relationship between the frequency elements must necessarily bear exactly the same phase relationship originally established in the original complex signal before frequency separation. Such latter circuit operation is required, for example, in the color television system described in a co-pending U. S. patent application by Alda V. Bedford, Serial No. 62,864, filed December 1, 1948, entitled "Color Television," now Patent No. 2,634,324, issued April 7, 1953. In my co-pending application Serial No. 116,801 filed September 20, 1949, entitled "Frequency Discriminatory System," now Patent No. 2,651,673, issued September 8, 1953, there is described a novel filter circuit arrangement, somewhat similar to the arrangement of the present invention, which serves to produce the required phase distortionless frequency separation of the Bedford color television system. However, whereas in my above-referenced co-pending application means are provided for separating a given signal band into upper and lower frequency components, no means are provided for obtaining a phase distortionless segregation of a given band of frequency falling within and embracing both upper and lower frequency components.

Furthermore, in electrical circuits designed to handle wide band signal intelligence, it is sometimes desirable to suppress a given frequency component or band of frequency components without interfering with the phase relationship of the signals immediately adjacent the frequency to be suppressed. The need for such a signal suppression or signal trapping may be found, by way of example, in another co-pending patent application by Alda V. Bedford, Serial No. 117,618, filed September 24, 1949, entitled "Color Television System," now Patent No. 2,677,721, issued May 4, 1954, which described a time division multiplexed color television system which can gainfully utilize a signal rejecting circuit active to suppress signal frequencies corresponding to the sampling rate of the time multiplexing system. Inasmuch as the rejector circuit is necessarily placed in a signal path handling video signals, it is required that a minimum of phase distortion be produced so as to minimize any possible degradation of the reproduced picture.

Numerous other instances in the electronic art wherein phase distortionless frequency rejection or separation is desired will occur to those skilled in the art.

It is therefore a purpose of the present invention to provide a novel circuit arrangement and method for separating complex waveform signals into frequency components which, after separation, bear substantially the same phase relationship as originally established in the complex signal.

It is a further purpose of the present invention to provide a new and improved apparatus and method for suppressing, in a wide band signal channel, certain frequency components without however producing phase distortion on signal components immediately adjacent the suppressed signal components.

A still further object of the present invention resides in the provision of a new and improved frequency separation circuit which will permit the extraction from a given band of signal frequencies of a subsidiary band of signal frequencies without producing phase distortion in either the extracted components or the original signal band.

It is yet another purpose of the present invention to provide a simple and effective signal trap circuit which produces a minimum phase distortion in the signal band to which the trap circuit is applied.

In one of its more general forms in which extraction of a given band of frequencies form a signal channel is to be obtained, the apparatus and method of the present invention contemplates the use of two low-pass filter circuits having substantially identical phase shift vs. frequency characteristics but different upper cutoff frequencies, one of the low pass filters may be designated with an upper cutoff frequency of $f_1$ while the other low pass filter may be designated with a higher cutoff frequency $f_2$. Means are then provided for concomitantly applying a given complex signal to the inputs of both low pass filter circuits while other means are provided for subtractively combining the outputs of these low pass filter circuits. Cancellation will then be made to take place between those frequency components common to the pass bands of both filter circuits, while permitting the appearance at the output of the subtracting means of those signal frequencies falling within the band $f_1$ to $f_2$.

In order to provide an effective phase distortionless trap circuit, the present invention further contemplates the use of a third electrical circuit having a phase shift vs. frequency characteristic substantially identical to both of the low pass filters but having substantially flat amplitude vs. frequency response over the entire range of signal frequencies represented by the complex signal. Means are further provided for supplying the input of this third circuit with the same signal applied to the inputs of the low pass filters and means are then provided for subtractively combining the signal appearing at the output of the first-mentioned combining means and the output of said third circuit to establish at the output of the last-named signal combining means an overall frequency response having an attenuation between the signal frequencies $f_1$ and $f_2$.

A more complete understanding of the operation of the present invention, as well as many other objects and features of advantages, in addition to those set forth hereinabove, will become apparent from the perusal of the following specification especially when considered in combination with the accompanying drawings in which.

Figure 1:
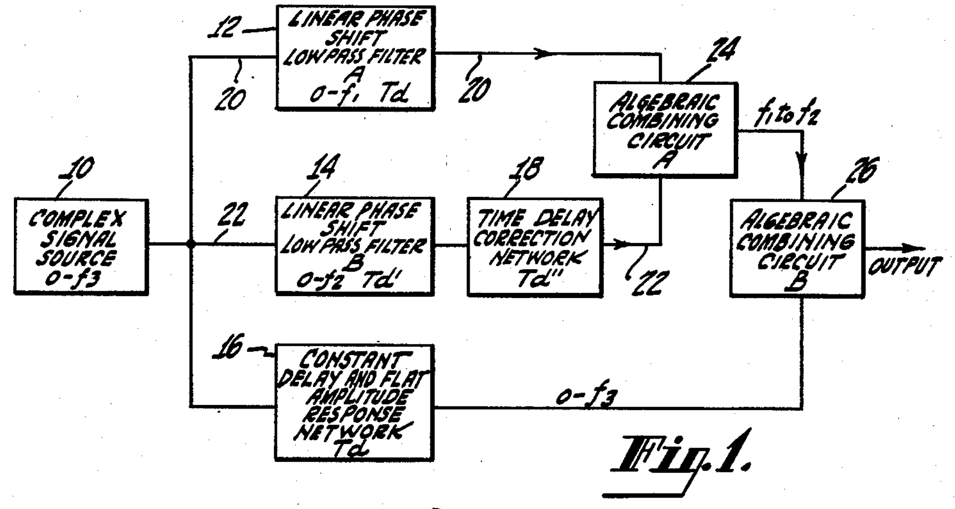
Figure 1 is a diagrammatic representation, in block form, of the present invention in one of its more general forms.

Turning now to Figure 1, there is indicated by block 10 a source of complex signal which shall be assumed to embrace a rather wide range of frequency components. The output of the complex signal source 10 is then, according to the present invention, applied to the input of the linear phase shift low pass filter A, at 12, the input of the linear phase shift low pass filter B, at 14, and the input of the constant delay and flat amplitude response network 16. A time delay correction network 18 is connected in series with the low pass filter 14 so as to render the signal delay characteristics of the circuit branches 20 and 22 substantially the same. Accordingly, the outputs of both linear phase shift filter A, at 12, and the time delay correcting network 18, are applied to algebraic combining circuit A at 24. The algebraic combining circuit A, at 24 is so arranged to allow cancellation of those signal frequencies common to the pass bands of the low pass filter A and the low pass filter B thereby providing at the output of algebraic combining circuit A a signal response corresponding to the band pass between the cutoff frequency of the low pass filter A and the cutoff frequency of the low pass filter B. Since the time delay of its two circuit branches 20 and 22 respectively embrace low pass filter A and low pass filter B, substantially no phase distortion will be evident in the output of algebraic combining circuit A.

In further accord with the present invention, the output of the algebraic combining circuit A may be subtractively combined with the output of the constant delay and flat amplitude response network 16 by means of algebraic combining circuit B at 26. Since again the algebraic combining circuit B will provide cancellation of all signal frequencies common to the pass characteristics of the constant delay network 16 and the output of the algebraic combining circuit A, at 24, the output of the combining circuit B will represent a substantially flat response except throughout the range of the band pass output of the combining circuit A. Thus, the output of the combining circuit B will appear to be trapped for that range of frequencies falling between the upper cutoff frequency of low pass filter A and the upper frequency of low pass filter B.

Figure 2:
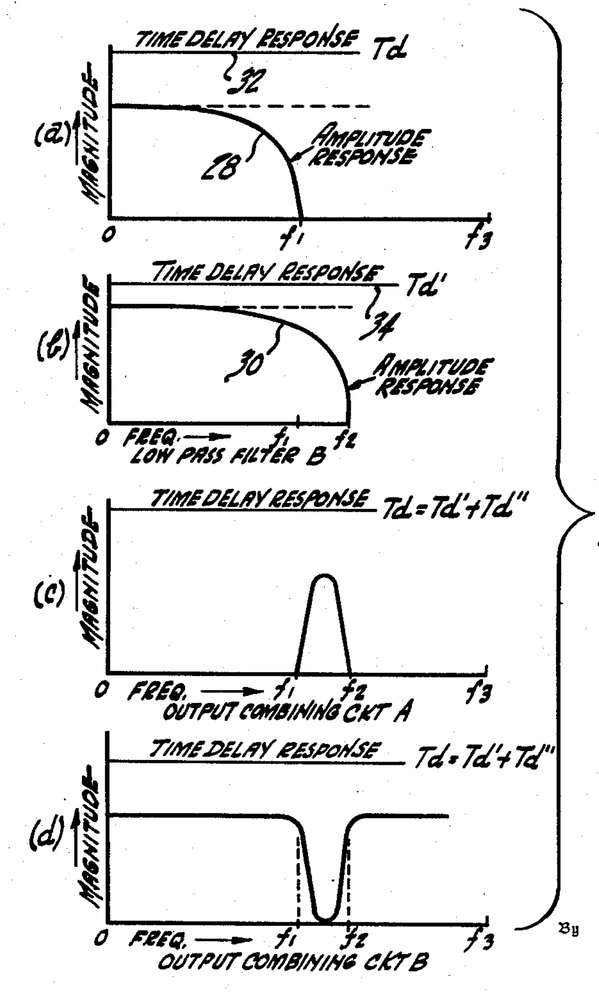
Figure 2 is a graphic representation of certain electrical characteristics of the arrangement shown in Figure 1.

Operation of the present invention, as illustrated in Figure 1, will be more clearly discerned by reference to the curve in Figure 2. In Figures 2*a* and 2*b* there are shown, by way of example, typical curves 28 and 30 of amplitude vs. frequency for the low pass filters A and B respectively. From curve 28 in Figure 2*a*, it is found that the low pass filter A, at 12, is capable of passing all frequencies from substantially zero cycles per second up to some nominal cutoff frequency $f_1$. The low pass filter A may have any predetermined phase shift vs. frequency characteristic but it is preferably designed to exhibit a substantially linear phase shift over the entire pass band of the filter. This linear phase shift will then correspond to some fixed time delay $T_d$ for all signals as indicated by the straight-line curve 32 in Figure 2*a*. The low pass filter B at 14 is similar to the low pass filter A but, as seen by curve 30 in Figure 2*b*, its upper cutoff frequency $f_2$ is made slightly higher. Accordingly, the phase shift vs. frequency response of the low pass filter B is made to be of a linear phase shift variety so that throughout its operating range zero to $f_2$ all signals are delayed by a predetermined time delay $T_{d'}$ represented by straight-line curve 34. Due to the wider acceptance of the low pass filter B, its time delay $T_{d'}$ will be somewhat smaller than the time delay $T_d$ of low pass filter A.

In order to render the time delay of circuit paths 20 and 22 equal, there is placed in series with the low pass filter B, a time delay correction network 18 having a time delay equal to $T_{d''}$. The value of $T_{d''}$ is such that when added to $T_{d'}$ the total delay of branch 22 of the circuit will be equal to the time delay of the low pass filter A, i. e., $T_d$. With this provision of the present invention, the outputs of the low pass filter A at 12 and the correcting network $T_{d''}$ may be directly applied to any conventional form of algebraic combining circuit such as 24. The combining circuit A at 24 is so arranged to effect subtraction of the signals applied to it so that the signals from the low pass filter A and the correcting network 18, being always in phase with one another, will directly subtract in the combining circuit and tend to cancel one another. If the amplitudes of the signals applied to the combining circuit are equal, complete cancellation of all signals common to the pass band of the low pass filters A and B will occur and only those signals residing between the frequencies $f_1$ and $f_2$ will appear at the output of the combining circuit A. It can therefore be seen that this arrangement of the low pass filters 12 and 14 along with the time delay circuit 18 and combining circuit 24 provide a novel band pass circuit which establishes an output significantly free of phase distortion. The characteristic of this band pass circuit for the illustrative frequencies given would of course appear as shown in Figure 2*c*. The effective delay of all the signals so passed would necessarily be equal to $T_d=T_{d'}+T_{d''}$.

In accordance with the present invention, the output of the combining circuit A may further be subtractively and algebraically combined with the output of the constant delay network 16, the network 16 having a flat amplitude response over the entire range of frequencies zero to $f_3$ in Figure 2 and having a time delay $T_d$ equal to the time delay of the signals appearing at the output of the combining circuit $A(T_d=T_{d'}+T_{d''})$. This subtractive algebraic combining may be accomplished by the combining circuit B at 26 so that the output of the circuit B may be represented by the curve 2*d*. Thus, the arrangement of Figure 1 taken as a whole may be thought of as a trap circuit for those frequencies residing between $f_1$ and $f_2$. It is manifest that the closer the cutoff frequency of low pass filter A and low pass filter B are brought into agreement, without coinciding, the sharper will be the characteristic of the trap circuit. Again since the time delay over all the circuits involved have been made equal and pure algebraic signal subtraction has been maintained, there will be no substantial phase distortion of the signals appearing at the output of the combining circuit B.

Figure 3:
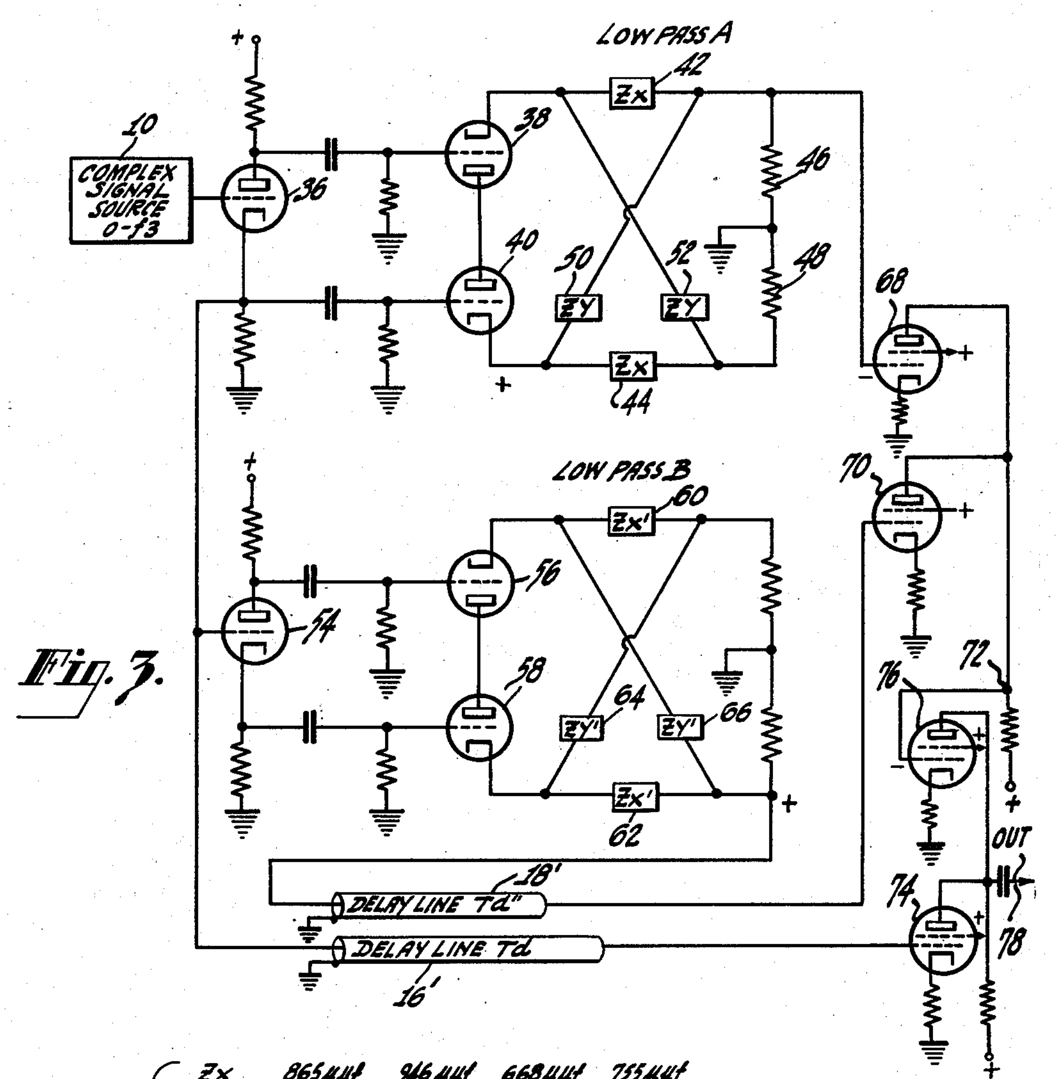
Figure 3 is a combination diagrammatic and schematic representation of an exemplary circuit arrangement suitable for practicing the invention shown more generally in Figure 1.
Figure 4:
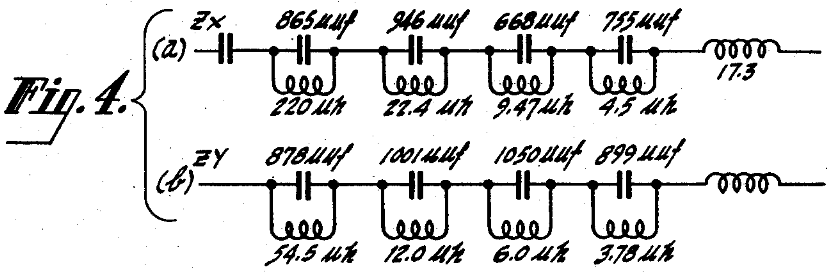
Figure 4 is a schematic representation of certain elements shown in block form in Figure 3.

By way of example of a suitable circuit arrangement for carrying out the present invention, the circuit of Figure 3 is shown. Here the output of the complex signal source 10 may be applied to the input of an amplifier tube 36 arranged for conventional push-pull drive of two amplifier tubes 38 and 40. The tubes 38 and 40 are further arranged as a typical push-pull amplifier having connected in their respective cathode circuits a low pass filter elements 42 and 44 and series resistance elements 46 and 48 to ground. The crossed-elements 50 and 52 of the lattice type low pass filter are shown in their typical crossed lattice connection. If, for example, it is desired to establish the upper cutoff frequency of this low pass filter arrangement at 2 mc., the configuration of the networks $Z_x$ and $Z_y$ could be substantially as shown in Figure 4. With the values shown, the low pass filter will have a substantially linear phase shift characteristic over its pass frequency range. This linear phase shift characteristic which represents a substantially constant time delay for all signal frequencies may be equivalently produced by a 32-foot section of 950 ohm surge impedance transmission line. Thus, the delay line 16′ of Figure 3 having its input supplied from the cathode circuit of the amplifier 36 may be made to serve as the constant delay and flat amplitude response network 16 of Figure 1. Accordingly, another low pass filter arrangement embracing amplifier tubes 56, 57, 58 and filter elements 60, 62, 64 and 66 is constructed along the same lines as the above-described low pass filter arrangement and excited from the cathode circuit of the amplifier tube 36. In accordance with the arrangement of Figure 1, the second low pass filter shown amplifier tubes 54, 56 and 58 will have their filter elements $Z_x'$ and $Z_y'$ slightly altered from the values shown in Figure 4 so as to establish a higher cutoff frequency. Delay line 18′ is then connected with the output of the second low pass filter to establish the required time delay $T_d''$ as explained in connection with element 18 of Figure 1.

Since each of the low pass filters above provided offers a push-pull output, selection of the particular arm of the push-pull output to be used is governed by the particular phase relationship of the signal appearing at the output arm relative to the input signal applied to the amplifiers 36 or 54. In accordance with the present invention, in order to effect subtractive algebraic combining of the output of low pass circuit A and the output of delay line 18′ in Figure 3, the outputs of the low pass filter A and B are taken from opposite extremities of their respective push-pull outputs. The output of the low pass circuit A is applied to the combining tube 68 which has its plate circuit common to the other combining amplifier 70. Therefore, the output appearing at terminal 72 of the combining amplifier 68 and 70 will correspond to the output of the combining circuit A in Figure 1 and is shown in character by the curve 2*c*. Again, in order to obtain the signal trapping effect of which the present invention is capable, the output of the delay line 16′ now being out of phase with the signals appearing at terminal 72 is applied to the grid of a combining amplifier 74 having its plate circuit common to the other combining amplifier 76. There will therefore appear at the output 78 of the combining amplifiers 74 and 76 the overall notched response illustrated in Figure 2*d*, frequencies between $f_1$ and $f_2$ being subtractively removed by the combining amplifiers 74 and 76 corresponding to the combining circuit B of Figure 1.

It will be appreciated that the utility of the present invention is, in no way, limited by the particular circuit arrangements employed herein for its description. Furthermore, the particular parametric orientations and circuit values shown in Figure 4 for the low pass filter in Figure 3 are only exemplary and may be altered in a variety of ways to produce other suitable characteristics for the low pass filters. Under such altered conditions, of course, the length and surge impedance of the transmission line should be appropriately altered to provide the necessary time delay or phase shift vs. frequency response. In some instances, equalization of the transmission lines 16′ and 18′ may be necessary to correct for discrepancies in phase vs. frequency response. Again the transmission line itself may be replaced by any suitable network having the proper phase and amplitude characteristics relative to change in frequency.

It is moreover manifest that although the individual low pass filters have been shown with a frequency response of zero cycles per second to some nominal cutoff frequencies, these low pass filters may be replaced by individual band pass filters having upper cutoff frequencies corresponding to $f_1$ and $f_2$. Any discrepancies in the lower cutoff frequency of such band pass filters would of course present another response at the output of the combining circuit A in Figure 1. Finally, it is to be understood that although the individual low pass filters A and B, as well as the delay networks 16 and 18 in Figure 1 have been indicated as having a linear phase shift characteristic, successful practice of the present invention is in no way limited thereby. Obviously, it is only necessary that the individual elements of Figure 1 have substantially identical phase shift vs. frequency characteristics and that linear phase shift characteristics, although preferable, are not necessary.

From the foregoing, it can be seen that the present invention has provided a simple and economical frequency discriminatory system which is readily applicable to many forms of communication equipment wherein it is desired to effect frequency separation of a signal with a minimum of phase distortion.

Having thus described the invention, what is claimed is:

1. In a signal system for handling signal frequencies between the values $f_1$ and $f_4$ including frequencies $f_2$ and $f_3$ where $f_1$, $f_2$, $f_3$, $f_4$ represent progressively higher signal frequencies, a minimum phase shift trap circuit for electrical signals falling within the range $f_2$ to $f_3$ comprising in combination, a first signal means for communicating only those signal frequencies falling between $f_1$ and $f_2$, a second signal means for communicating only those signal frequencies falling between $f_1$ and $f_3$, means for concomitantly applying said input signals to the inputs of both said first and second signal means, means for algebraically combining the outputs of said signal means such to permit at least partial cancellation of those signal frequencies in the range $f_1$ to $f_2$ whereby there appears at the output of said combining means a preponderance of those signal frequencies falling between $f_2$ and $f_3$, a band pass system adapted to pass all frequencies between $f_1$ and $f_4$, means for also applying said input signals to said band pass system input and means for subtractively combining the output signals of said band pass system with the output signals of said algebraic combining means.

2. Apparatus according to claim 1 wherein said first and second signal means as well as said band pass system exhibits substantially identical time delay characteristics.

3. Apparatus according to claim 1 wherein said first and second signal means are of the linear phase shift variety and of equivalent characteristics and wherein said band pass system comprises a flat amplitude delay line having a time delay equivalent to the linear phase shift characteristics of said first and second signal means.

4. In an electrical signal circuit having an input terminal for receiving a complex signal embracing low, intermediate and high frequency components, the combination of a restricted band pass system designed to pass only frequencies from 0 up to and including a restricted portion of said intermediate frequency complex signal components, said restricted band pass system having a substantially linear phase shift versus frequency characteristics and comprising in combination a first low pass filter having a predetermined time delay $T_d$ and frequency response up to a relatively low intermediate frequency, $f_1$, a second low pass filter having substantially the same time delay $T_d$ as said first low pass filter but having a greater frequency response up to a relatively high intermediate frequency, $f_2$, and means connected with the outputs of said first and second low pass filters for subtractively combining their outputs whereby to cancel frequency components concomitantly passed by both of said low pass filters thereby to substantially restrict the output of said combining means to a range of intermediate frequency signals falling between $f_1$ and $f_2$, a broad band pass system having a substantially flat amplitude versus frequency response and a substantially linear phase shift versus frequency characteristics over a range of frequencies embraced by said complex signal and in excess of that range embraced by said restricted band pass system, means for applying complex signal concomitantly to the inputs of said restricted band pass and broad pass systems, and means for combining the outputs of said restricted band pass and broad band pass systems in such phase relation to effect cancellation of those frequency components common to the frequency pass characteristics of each system.

References Cited in the file of this patent

UNITED STATES PATENTS

| | | |
|---|---|---|
| 1,759,952 | McCurdy | May 27, 1930 |
| 1,902,031 | Holden | Mar. 21, 1933 |
| 1,956,121 | Craig | Apr. 24, 1934 |
| 2,020,409 | Green | Nov. 12, 1935 |
| 2,054,794 | Dietzold | Sept. 22, 1936 |
| 2,263,519 | Ritzmann | Nov. 18, 1941 |
| 2,342,638 | Bode | Feb. 29, 1944 |
| 2,434,904 | Busignies | Jan. 27, 1948 |
| 2,550,596 | Pfleger | Apr. 24, 1951 |